Patented Dec. 25, 1934

1,985,613

UNITED STATES PATENT OFFICE 1,985,613

PROCESS FOR STABILIZING THE COLOR OF NAPHTHAS

Gordon McIntyre and Ernst G. Ulbricht, Sarnia, Ontario, Canada, assignors to Standard Oil Development Company, a corporation of Delaware No Drawing. Application April 16, 1932, Serial No. 605,780

1 Claim. (Cl. 44—9)

This invention relates to a process for stabilizing the color of naphthas, especially petroleum naphthas, and will be understood from the following description:

It is known to those skilled in the art that some naphthas, such as ordinary gasoline, when exposed to sunlight gradually deteriorate in color, become cloudy and finally deposit gum. It is also known that some other naphthas will undergo a similar deterioration during the storage in tanks (dark storage). There are also naphthas which show a poor stability both in sunlight and during dark storage. The conditions of sunlight and dark storage stability vary with the stock and the method of obtaining the finished naphtha.

We have discovered that naphthas showing poor stability on sunlight are greatly improved in this respect by treatment with a polyhydric aliphatic alcohol such as glycerol and especially ethylene glycol. Agitation of the naphtha with ethylene glycol, settling and separation of the glycol layer, are the principal steps of our process. The amount of glycol used in the treatment may vary within broad limits although in many cases less than 5% by volume of glycol will be sufficient. The naphtha may be given one treat or a number of treats in succession. The treatment is usually carried out at atmospheric temperature.

We do not know the exact nature of the action of the polyhydric alcohol, such as ethylene glycol, on the naphtha but it may be assumed that in most cases the glycol acts as a solvent removing the material which is precipitated on sunlight exposure and causes gum and color instability. In some cases, however, sufficient sunlight stability is obtained by treating the gasoline with an exceedingly small amount of ethylene glycol such as for example 0.1 pounds of glycol per 1,000 gallons of gasoline. The treatment with such a small amount of glycol does not result in the separation of two layers but the glycol dissolves completely in the gasoline. The treatment with such minute amounts of glycol gives satisfactory results (sunlight stability) with certain stocks but not so with other stocks. It can be determined by experimentation whether a certain gasoline may be color stabilized by treatment with a minute amount of ethylene glycol, that is by dissolving in it a minute amount of ethylene glycol or whether it is necessary to treat the gasoline with a larger portion, say 2–3% by volume of ethylene glycol. When the gasoline has been treated with a large portion of ethylene glycol it is usually advantageous to water wash it after the settling and the separation of the glycol layer.

The following example will illustrate our process:

A straight run naphtha obtained from Mid-Continent crude which was finished by a hot lye treat and showed an excellent dark storage stability but an unsatisfactory stability on sunlight, was treated with 2½% by volume of ethylene glycol. After the settling and removal of the glycol layer it was water washed. The product thus obtained was color stable after several weeks' exposure to sunlight. The polyhydric alcohol, such as glycol, may also be dissolved in an organic carrier liquid and the treatment effected with the solution thus obtained. It is necessary that the carrier liquid be of such nature that the solution of the polyhydric alcohol in it be not completely miscible with the naphtha. Methyl alcohol has been found to be the best carrier liquid.

As mentioned above some naphthas show poor stability both in sunlight and during dark storage. We have discovered that such naphthas may be satisfactorily stabilized by a modification of our process. This modification consists of giving the naphtha a combined treatment with the polyhydric alcohol and pyrogallol. The combined treatment may be carried out by dissolving a small amount of pyrogallol in the ethylene glycol, agitating the naphtha with the solution and separating the polyhydric alcohol layer from the naphtha layer. The naphtha thus treated should not be washed with water after the separation of layers because the water wash would remove the pyrogallol dissolved in the naphtha. In order to obtain the best results the settling of the layers must be complete before the naphtha is separated and stored.

The combined treatment may also be carried out in two stages. In this case the naphtha is first treated with the ethylene glycol or glycerol, settled over night, decanted, and then filtered through pyrogallol crystals, whereby a small amount of pyrogallol dissolves in the naphtha. Instead of filtering the gasoline through the pyrogallol crystals the latter may be added directly to the naphtha or in the presence of a solvent such as benzol, methyl alcohol, etc. The amount of pyrogallol needed is very small, usually not more than about 0.1 gram per litre of naphtha.

The following example will illustrate our combined treating method. A naphtha obtained by mixing straight run and cracked distillates of Mid-Continent crude which showed a poor stability both on sunlight and during dark storage, was given two treats, each with 2.5% by volume of a saturated solution obtained by dissolving 5 parts of pyrogallol in 95 parts of ethylene glycol. After settling over night the naphtha was decanted and showed an excellent stability both on sunlight and in dark storage.

Our invention is not to be limited by any theory nor by the examples given for the purpose of illustration but only by the following claim in which it is our intention to claim all novelty inherent in the process.

We claim:

The method of stabilizing motor fuels comprising cracked gasoline of the type which contains constituents tending to develop objectionable color and gum when exposed to sunlight comprising extracting a portion of the more readily oxidizable constituents by washing the fuel with less than about 5% of ethylene glycol, removing the extraction solvent layer from the motor fuel, and leaving a small amount of the ethylene glycol in the motor fuel, this amount being sufficient to stabilize the motor fuel.

GORDON McINTYRE.
ERNST G. ULBRICHT.